United States Patent
Warshavsky et al.

(10) Patent No.: US 11,032,583 B2
(45) Date of Patent: Jun. 8, 2021

(54) METHOD AND SYSTEM FOR IMPROVING HIGH AVAILABILITY FOR LIVE CONTENT

(71) Applicant: Qwilt, Inc., Redwood City, CA (US)

(72) Inventors: Arnon Warshavsky, Ben Ammi (IL); Shmulik Biran, Kiryat Ono (IL); Dror Meidan, Hod-Hasharon (IL)

(73) Assignee: QWLT, Inc., Redwood City, CA (US)

( * ) Notice: Subject to any disclaimer, the term of this patent is extended or adjusted under 35 U.S.C. 154(b) by 0 days.

(21) Appl. No.: 16/790,063

(22) Filed: Feb. 13, 2020

(65) Prior Publication Data
US 2020/0186847 A1    Jun. 11, 2020

Related U.S. Application Data

(63) Continuation-in-part of application No. 16/151,868, filed on Oct. 4, 2018, which is a continuation of application No. 15/078,543, filed on Mar. 23, 2016, now Pat. No. 10,097,863, which is a continuation-in-part of application No. 13/006,785, filed on Jan. 14, 2011, now Pat. No. 9,723,073.

(60) Provisional application No. 62/805,123, filed on Feb. 13, 2019, provisional application No. 61/375,836, filed on Aug. 22, 2010, provisional application No. 62/140,067, filed on Mar. 30, 2015, provisional application No. 62/146,266, filed on Apr. 11, 2015.

(51) Int. Cl.
| | |
|---|---|
| *H04N 21/231* | (2011.01) |
| *H04L 29/06* | (2006.01) |
| *H04L 29/08* | (2006.01) |
| *H04N 21/472* | (2011.01) |

(52) U.S. Cl.
CPC . *H04N 21/23103* (2013.01); *H04L 29/08729* (2013.01); *H04L 65/4076* (2013.01); *H04L 65/4084* (2013.01); *H04L 67/02* (2013.01); *H04L 67/1095* (2013.01); *H04L 67/1097* (2013.01); *H04N 21/47202* (2013.01)

(58) Field of Classification Search
None
See application file for complete search history.

(56) References Cited

U.S. PATENT DOCUMENTS

| | | |
|---|---|---|
| 5,790,176 A | 8/1998 | Craig |
| 5,829,046 A | 10/1998 | Tzelnic et al. |

(Continued)

OTHER PUBLICATIONS

Non-Final Office Action dated Sep. 25, 2012 for U.S. Appl. No. 13/006,785.

(Continued)

*Primary Examiner* — Esther B. Henderson
(74) *Attorney, Agent, or Firm* — M&B IP Analysts, LLC

(57) ABSTRACT

A system and method for acquiring live content for a content delivery network (CDN). The method includes: intercepting a content manifest based on a content session initiated by a first user node and a broadcast server, where the content manifest includes at least one content identifier (ID) and its corresponding content chunk; fetching the content chunk to store in a memory of the CDN; receiving a request from a second user node for content of the content session; continuously determining a leader user node between at least the first user node and the second user node; and fetching at least a content chunk based on a content manifest of the leader user node.

21 Claims, 3 Drawing Sheets

(56) References Cited

U.S. PATENT DOCUMENTS

| | | |
|---|---|---|
| 5,893,140 A | 4/1999 | Vahalia et al. |
| 5,933,603 A | 8/1999 | Vahalia et al. |
| 5,944,789 A | 8/1999 | Tzelnic et al. |
| 5,948,062 A | 9/1999 | Tzelnic et al. |
| 6,049,530 A | 4/2000 | Petersen et al. |
| 6,061,504 A | 5/2000 | Tzelnic et al. |
| 6,363,413 B2 | 3/2002 | Kidder |
| 6,536,037 B1 | 3/2003 | Guheen et al. |
| 6,615,166 B1 | 9/2003 | Guheen et al. |
| 6,700,889 B1 | 3/2004 | Nun |
| 6,772,193 B1 | 8/2004 | Igawa et al. |
| 6,799,248 B2 | 9/2004 | Scherr |
| 6,823,401 B2 | 11/2004 | Feather et al. |
| 6,831,893 B1 | 12/2004 | Nun et al. |
| 6,873,600 B1 | 3/2005 | Duffield et al. |
| 6,985,956 B2 | 1/2006 | Luke et al. |
| 6,986,018 B2 | 1/2006 | O'Rourke et al. |
| 7,149,698 B2 | 12/2006 | Guheen et al. |
| 7,281,260 B2 | 10/2007 | Puente et al. |
| 7,310,480 B2 | 12/2007 | Maciocco et al. |
| 7,349,979 B1 | 3/2008 | Cieslak et al. |
| 7,436,830 B2 | 10/2008 | Ben-Nun et al. |
| 7,596,664 B2 | 9/2009 | Ishikawa et al. |
| 7,606,314 B2 | 10/2009 | Coleman et al. |
| 7,685,254 B2 | 3/2010 | Pandya |
| 7,697,557 B2 | 4/2010 | Segel |
| 7,719,966 B2 | 5/2010 | Luft et al. |
| 7,818,402 B1 | 10/2010 | Zhang |
| 7,912,921 B2 | 3/2011 | O'Rourke et al. |
| 7,957,396 B1 | 6/2011 | Kohn et al. |
| 8,009,682 B2 | 8/2011 | Gopinath et al. |
| 8,065,559 B2 | 11/2011 | Kamath et al. |
| 8,600,830 B2 | 12/2013 | Hoffberg |
| 8,607,166 B2 | 12/2013 | Jalon et al. |
| 8,621,101 B1 | 12/2013 | Starr et al. |
| 8,706,900 B2 | 4/2014 | Carver et al. |
| 8,737,407 B2 | 5/2014 | Shetty et al. |
| 8,937,942 B1 | 1/2015 | Li et al. |
| 8,959,299 B2 | 2/2015 | Ngo et al. |
| 2001/0049732 A1 | 12/2001 | Raciborski et al. |
| 2001/0051980 A1 | 12/2001 | Raciborski et al. |
| 2002/0006124 A1 | 1/2002 | Jimenez et al. |
| 2002/0040366 A1 | 4/2002 | Lahr |
| 2002/0040404 A1 | 4/2002 | Lahr |
| 2002/0042817 A1 | 4/2002 | Lahr |
| 2002/0048269 A1 | 4/2002 | Hong et al. |
| 2002/0062372 A1 | 5/2002 | Hong et al. |
| 2002/0136204 A1 | 9/2002 | Chen et al. |
| 2003/0097443 A1 | 5/2003 | Gillett et al. |
| 2003/0106064 A1 | 6/2003 | Plourde |
| 2003/0221127 A1 | 11/2003 | Risan et al. |
| 2004/0128693 A1 | 7/2004 | Weigand |
| 2004/0133776 A1 | 7/2004 | Putzolu |
| 2004/0181579 A1 | 9/2004 | Huck et al. |
| 2005/0015702 A1 | 1/2005 | Shier et al. |
| 2005/0022237 A1 | 1/2005 | Nomura |
| 2005/0213514 A1 | 9/2005 | Su et al. |
| 2005/0289111 A1 | 12/2005 | Tribble et al. |
| 2006/0129697 A1 | 6/2006 | Vange et al. |
| 2006/0168318 A1 | 7/2006 | Twiss |
| 2006/0224687 A1 | 10/2006 | Popkin et al. |
| 2006/0271972 A1 | 11/2006 | Pai et al. |
| 2007/0050686 A1 | 3/2007 | Keeton et al. |
| 2007/0124781 A1 | 5/2007 | Casey et al. |
| 2007/0192474 A1 | 8/2007 | Decasper et al. |
| 2007/0244987 A1 | 10/2007 | Pedersen et al. |
| 2008/0010381 A1 | 1/2008 | Barraclough et al. |
| 2008/0307343 A1 | 12/2008 | Robert et al. |
| 2009/0083279 A1 | 3/2009 | Hasek |
| 2009/0119734 A1 | 5/2009 | Deshpande et al. |
| 2009/0172565 A1 | 7/2009 | Jackson et al. |
| 2009/0193129 A1 | 7/2009 | Agarwal et al. |
| 2009/0307757 A1 | 12/2009 | Groten |
| 2009/0313437 A1 | 12/2009 | Sofman et al. |
| 2010/0023726 A1 | 1/2010 | Aviles |
| 2010/0054257 A1 | 3/2010 | Dolganow et al. |
| 2010/0082774 A1 | 4/2010 | Pitts |
| 2010/0115072 A1 | 5/2010 | Payyappilly et al. |
| 2010/0287227 A1 | 11/2010 | Goel et al. |
| 2011/0055386 A1 | 3/2011 | Middleton et al. |
| 2011/0078343 A1 | 3/2011 | Resch et al. |
| 2011/0107185 A1 | 5/2011 | Grube et al. |
| 2011/0141887 A1 | 6/2011 | Klein et al. |
| 2011/0153937 A1 | 6/2011 | Annamalaisami et al. |
| 2011/0173345 A1* | 7/2011 | Knox ............... H04L 69/08 709/246 |
| 2012/0011271 A1 | 1/2012 | Zhao et al. |
| 2012/0030212 A1 | 2/2012 | Koopmans et al. |
| 2012/0047224 A1 | 2/2012 | Shemesh et al. |
| 2012/0047252 A1 | 2/2012 | Maor et al. |
| 2012/0057460 A1 | 3/2012 | Hussain et al. |
| 2012/0084464 A1 | 4/2012 | Cochinwala et al. |
| 2012/0117610 A1 | 5/2012 | Pandya |
| 2012/0124618 A1 | 5/2012 | Ruiz-Velasco et al. |
| 2012/0159329 A1 | 6/2012 | Chow et al. |
| 2012/0159558 A1 | 6/2012 | Whyte et al. |
| 2014/0059156 A1* | 2/2014 | Freeman, II ......... H04L 63/061 709/213 |
| 2014/0108586 A1 | 4/2014 | Zhao |
| 2015/0271226 A1* | 9/2015 | Luby ............... H04L 47/125 709/231 |
| 2015/0358373 A1* | 12/2015 | Famaey ............. H04L 67/06 709/231 |
| 2016/0021057 A1 | 1/2016 | Frost et al. |
| 2018/0309840 A1* | 10/2018 | Zachman ........... H04L 65/602 |
| 2020/0186847 A1* | 6/2020 | Warshavsky ....... H04L 67/1097 |

OTHER PUBLICATIONS

Non-Final Office Action dated Jul. 26, 2012 in U.S. Appl. No. 13/006,875.

* cited by examiner

METHOD AND SYSTEM FOR IMPROVING HIGH AVAILABILITY FOR LIVE CONTENT

CROSS-REFERENCE TO RELATED APPLICATIONS

This application claims the benefit of U.S. Provisional Application No. 62/805,123 filed on Feb. 13, 2019, the contents of which are hereby incorporated by reference. This application is also a continuation-in-part application (CIP) of U.S. patent application Ser. No. 16/151,868 filed Oct. 4, 2018. The Ser. No. 16/151,868 application is also a continuation of Ser. No. 15/078,543, filed Mar. 23, 2016, now U.S. Pat. No. 10,097,863, which is a CIP of Ser. No. 13/006,785, filed Jan. 14, 2011, now U.S. Pat. No. 9,723,073, which claims the benefit of 61/375,836, filed Aug. 22, 2010, and said Ser. No. 15/078,543, filed Mar. 23, 2016, which claims the benefit of 62/140,067, filed Mar. 30, 2015, and which claims the benefit of 62/146,266, filed Apr. 11, 2015.

TECHNICAL FIELD

The disclosure generally relates to content delivery networks and particularly to improving content caching in a content delivery network.

BACKGROUND

Content delivery networks (CDNs) are a vital part of the Internet today, and allow for global content availability and distribution. CDNs store content which may be accessed by user devices near the CDN, and, in this way, allow for distribution of network resources. Acquisition of content is a key element of an effective CDN, aiming to reduce latency between the client requesting content and the CDN delivering said content.

A solution, for example, which would identify a content session of a user, and acquire content by following the content session of a single user, may be limited by dependence on that user. In such an example, if a user decides to pause the content, or they have a poor connection, following the specific user's session would cause all the other users, which are provided with the content based on the activity of the first user, to experience all the lag which the first user suffers from.

It would, therefore, be advantageous to provide a solution for CDNs which improves its capabilities in content acquisition.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for acquiring live content for a content delivery network (CDN). The method comprises the steps of intercepting a content manifest based on a content session initiated by a first user node and a broadcast server, where the content manifest includes at least one content identifier (ID) and its corresponding content chunk; fetching the content chunk to store in a memory of the CDN; receiving a request from a second user node for content of the content session; continuously determining a leader user node between at least the first user node and the second user node; and fetching at least a content chunk based on a content manifest of the leader user node.

Certain embodiments disclosed herein also include a non-transitory computer readable medium having stored thereon instructions for causing a processing circuitry to perform a process, the process comprising the steps of intercepting a content manifest based on a content session initiated by a first user node and a broadcast server, where the content manifest includes at least one content identifier (ID) and its corresponding content chunk; fetching the content chunk to store in a memory of the CDN; receiving a request from a second user node for content of the content session; continuously determining a leader user node between at least the first user node and the second user node; and fetching at least a content chunk based on a content manifest of the leader user node.

Certain embodiments disclosed herein also include a system for acquiring live content for a content delivery network (CDN). The system comprises: a processing circuitry; and a memory, the memory containing instructions that, when executed by the processing circuitry, configure the system to: intercept a content manifest based on a content session initiated by a first user node and a broadcast server, where the content manifest includes at least one content identifier (ID) and its corresponding content chunk; fetch the content chunk to store in the CDN; receive a request from a second user node for content of the content session; continuously determine a leader user node between at least the first user node and the second user node; and fetch at least a content chunk based on a content manifest of the leader user node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
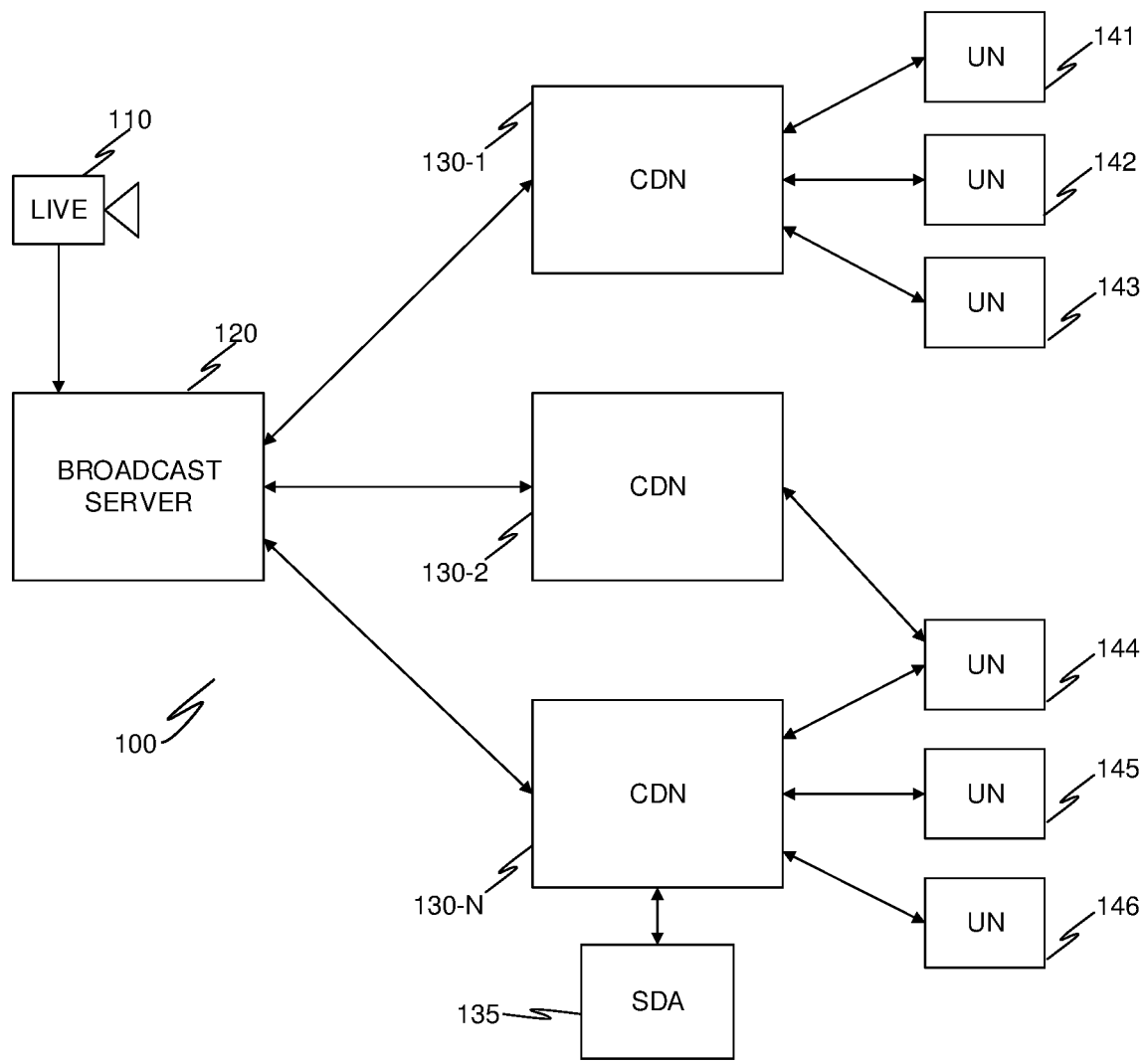
FIG. 1 is a schematic illustration of a plurality of content delivery networks delivering a live broadcast content, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram 100 illustrating a plurality of content delivery networks delivering live broadcast content, implemented in accordance with an embodiment.

In an example embodiment, live content is generated, for example, by a camera 110. The camera 110 is communicatively connected with a broadcast server 120. The broadcast server 120 is communicatively connected with a network 101, which may allow, in certain embodiments, for connection of the broadcast server 120 to the Internet.

In an embodiment, the network 101 may be configured to provide connectivity of various sorts, as may be necessary, including, but not limited to, wired and/or wireless connectivity, including, for example, local area networks (LAN), wide area networks (WAN), metro area networks (MAN), world wide web (WWW), Internet, and any combination thereof, as well as cellular connectivity. This would allow a user node (or client device) to connect to the broadcast server 120 and view the content recorded by the camera 110.

Typically, the broadcast server 120 has a limited number of connections the server 120 can sustain. In an embodiment, the number of connections may be significantly lower than the number of user nodes 141-146 which wish to view the content.

In order to solve this problem, content delivery networks (CDNs) 130 are deployed. The purpose of a CDN is to provide high availability of content to a geographical area which includes user nodes 141-146 in physical proximity to the elements of the CDN. For example, the Olympic events are typically broadcast from a single country but viewed around the world. The broadcast server 120 may be located, for example in Brazil, while a first CDN 130-1 is located in North America, a second CDN 130-2 is located in Europe, and a third CDN 130-N is located in Asia. It should be readily understood that this example is in no way limiting, and CDNs are not bound to be country based.

When a user node 144 requests the live content from the broadcast server 120, the request is intercepted by a CDN 130. Each CDN 130 typically includes a service delivery apparatus (SDA) 135 and proxy servers (not shown) and content storage (not shown). The CDN should acquire the content and provide the acquired content to a user node 144. When, for example, a user node 145 requests to view the content at a later time, the CDN 130-N may readily supply the requested content, as such content was already requested by user node 144 before.

The SDA 135 is a component or otherwise connected to a CDN 130 which is configured to continuously determine what content should be cached by the CDN 130 in order to provide to the local user nodes 144-146. The SDA 135 is discussed in more detail in U.S. Pat. No. 9,723,073 titled "A System for Detection of Content Servers and Caching Popular Content Therein", assigned to common assignee, the contents of which are incorporated by reference herein. The SDA 135 may be configured as a sniffer, or as a 'bump-in-the-wire.' In this example, the SDA 135 is configured as a sniffer.

When configured as a sniffer, the SDA 135 is configured to listen to the traffic moving between a content network and the broadcast server 120 without routing packets through the SDA 135. When the SDA 135 is connected in a sniffer mode, the SDA 135 typically connects to the CDN 130 through a separate communication port to provide content stored therein to a destination (e.g. client device) connected to the content delivery network.

Typically, when a first user node 144 requests content from the broadcast server 120, the server 120 is configured to return a manifest which includes content IDs and corresponding chunks of content which can be served. A user node requests the content chunks based on the content ID, in the order which is specified by the manifest. As this is a live broadcast, the manifest is constantly updated by the broadcast server 120.

When the SDA 135 is configured to intercept the content manifest of a user node 144, the SDA 135 typically continues to monitor the data session of a user node 144. This is performed in order to determine, from the manifest, what the available chunks of content are, so that such chunks can be downloaded from the broadcast server 120 to, for example, the CDN 130-N. The chunks downloaded to CDN 130-N are stored and delivered to user nodes 145 and 146 when they request delivery of the live broadcast. In an embodiment, a user node 144 is known as the leader, as is the user node from which the SDA 135 bases the content fetching.

However, configuring an SDA thus results in a limitation. Essentially, the user nodes 145 and 146 are limited by the bandwidth of the user node 144. For example, if the user node 144 has low bandwidth, the node 144 requests content at a slower pace than a user node which has higher bandwidth, such as the user node 145.

In order to overcome the bandwidth limitation, according to the disclosed embodiments, the SDA 135 is configured to continuously determine the leader user node, so as to have access to a manifest with as much content as possible. Downloading of the content earlier from the broadcast server 120 to, for example, the CDN 130-N may result in being able to provide the content to the user nodes at a higher rate.

In an example embodiment, some user nodes, such as user node 144 may receive content from more than one CDN, such as CDN 130-N, where 'N' is an integer having a value of '2' or greater.

Figure 2:
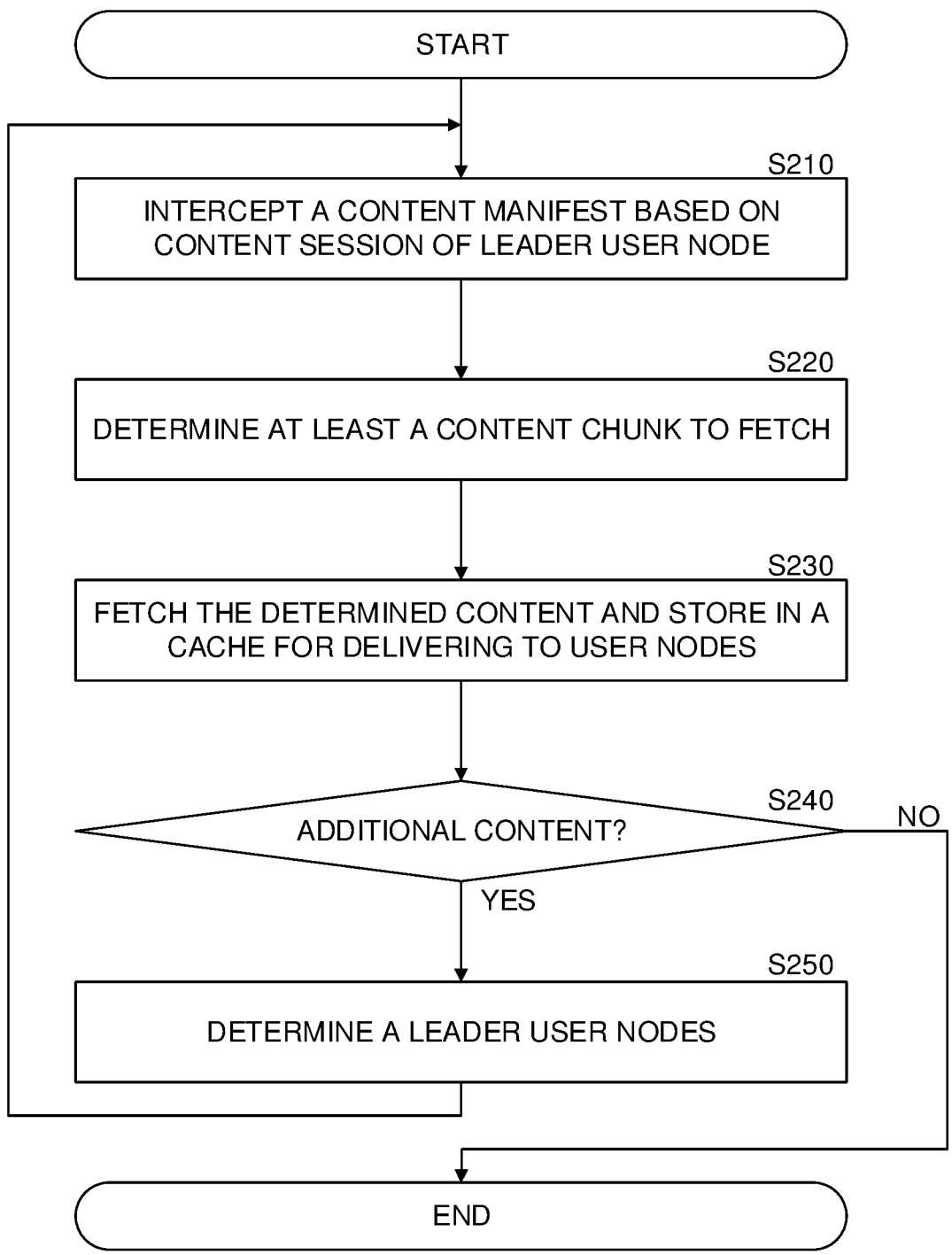
FIG. 2 is a flowchart of a method for improving content delivery network caching, implemented in accordance with an embodiment.

FIG. 2 is an example flowchart 200 of a method for improving content delivery network caching, implemented in accordance with an embodiment.

At S210, a content manifest is intercepted based on a content session of a user node. The user node is designated as a leader user node. The content session includes a request from the user node to a broadcast server to receive a stream of live content. The content manifest includes at least one content ID and a corresponding content chunk. In some embodiments, the content ID may be further segmented into different resolutions, so that the same content can be delivered at different resolutions.

In certain embodiments, it is not uncommon for the resolution of a video content to change throughout the content session, adapting to the conditions of the network and available bandwidth.

At S220, it is determined if at least one content chunk should be fetched. The determination is based on the content manifest. In some embodiments, a request is sent to the broadcast server requesting the same content in different resolutions. This is performed in order to be ready to supply, to other user nodes, the content, at different resolutions. In some embodiments, the content, at different resolutions, can be delivered depending on the conditions of the network.

At S230, one or more determined chunks are fetched. In an embodiment, to fetch the chucks, a request is sent to the broadcast server for the content. The request may include the content ID, or content ID and resolution. The fetched chunks are stored by the SDA from its cache memory. In an embodiment, some of the fetched chunks may be saved in a fast access memory, while some other chunks are stored on a slower access storage device of the SDA. The fast access memory includes one of a random-access memory (RAM) and a solid-state drive (SSD). The slower access memory may include magnetic technologies (e.g., HDDs) which are considered relatively slow. It should be noted that also two different types of SSDs can be used, one type is slower than the other.

At S240, a check is performed to determine if additional content should be requested. In an embodiment, S240 includes determining if there are additional content IDs on the content manifest which were not yet received. Alternatively, it is checked if additional content should be requested from the broadcast server based on an updated manifest. If additional content should be requested, execution continues at S250, otherwise execution terminates.

At S250, a leader user node is identified. In an embodiment, S250 includes monitoring requests for content from other user nodes (e.g., a second user node), to determine if another leader user node should be selected in place of the current leader user node. Typically, the leader user node is the user node with the most advanced content manifest, i.e., the user node which has the most future content chunks available to it for download from the broadcast server. Once a leader is determined, execution returns to S210.

In an embodiment, the method described with reference to FIG. 2 is performed by the SDA, e.g., the SDA 135. An example block diagram of the SDA is provided in FIG. 3.

Figure 3:
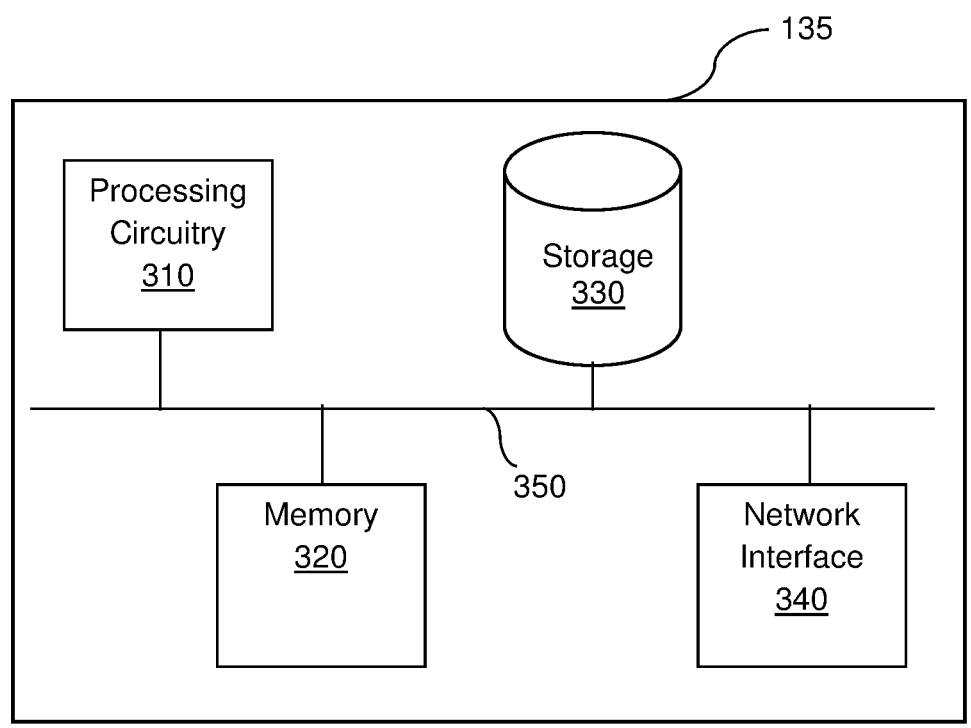
FIG. 3 is a schematic diagram of an SDA according to an embodiment.

FIG. 3 is an example schematic diagram of an SDA 135 according to an embodiment. The SDA 135 includes a processing circuitry 310 connected to a memory 320, a storage 330, and a network interface 340. In an embodiment, the components of the SDA 135 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 may be magnetic storage, optical storage, and the like, and may be realized, for example, as flash memory, SSD, or other memory technology, CD-ROM, Digital Versatile Disks (DVDs), or any other medium which can be used to store the desired information. The network interface 340 allows the SDA 135 to communicate with the CDN 130 and the broadcast server 120 (FIG. 1). In an embodiment, the storage 330 may include two type of storage units including a slower access memory and fast access memory as discussed above. The cache of SDA 135 may be part of the storage 330.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for acquiring live content for a content delivery network (CDN), comprising:
   intercepting a content manifest based on a content session initiated by a first user node and a broadcast server, wherein the content manifest includes at least one content identifier (ID) and a corresponding content chunk;
   fetching the corresponding content chunk to store in a memory of the CDN;
   receiving a request from a second user node for content of the content session;
   continuously determining a current leader user node between at least the first user node and the second user node; and
   fetching at least a content chunk based on a content manifest of the current leader user node.

2. The method of claim 1, further comprising:
   determining, based on the content manifest, if at least one content chunk should be fetched.

3. The method of claim 1, wherein the intercepted content manifest also includes a request sent to the broadcast server.

4. The method of claim 1, wherein fetching the content chunk to store in the CDN, further comprises:
   fetching the content chunk from a cache of the CDN.

5. The method of claim 3, wherein some of the fetched content chunks are fetched from a fast access memory, and some other fetched content chunks are fetched from a slower access storage device.

6. The method of claim 1, wherein continuously determining the current leader user node further comprises:
   monitoring requests for content from at least the second user node; and
   determining if the second user node is selected to replace the current leader node.

7. The method of claim 6, wherein the current leader node is the first user node.

8. The method of claim 6, wherein a user node with the most future content chunks is determined to be the current leader node.

9. The method of claim 1, wherein the method is performed by a service delivery apparatus (SDA) connected to the CDN, wherein the CDN is deployed between the broadcast server and at least the first and second user nodes.

10. The method of claim 1, wherein the content ID is segmented into different resolutions, and wherein the content chunks are delivered at different resolutions based on the segmented content ID.

11. A non-transitory computer readable medium having stored thereon instructions for causing a processing circuitry to execute a process, the process comprising:
   intercepting a content manifest based on a content session initiated by a first user node and a broadcast server, wherein the content manifest includes at least one content identifier (ID) and a corresponding content chunk;
   fetching the corresponding content chunk to store in a memory of the CDN;
   receiving a request from a second user node for content of the content session;
   continuously determining a current leader user node between at least the first user node and the second user node; and
   fetching at least a content chunk based on a content manifest of the current leader user node.

12. A service delivery apparatus for acquiring live content for a content delivery network (CDN), comprising:
   a processing circuitry; and
   a memory, the memory containing instructions that, when executed by the processing circuitry, configure the apparatus to:
   intercept a content manifest based on a content session initiated by a first user node and a broadcast server, wherein the content manifest includes at least one content identifier (ID) and a corresponding content chunk;
   fetch the content chunk to store in the CDN;
   receive a request from a second user node for content of the content session;
   continuously determine a current leader user node between at least the first user node and the second user node; and
   fetch at least a content chunk based on a content manifest of the current user node.

13. The service delivery apparatus of claim 12, wherein the service delivery apparatus is further configured to:
   determine, based on the content manifest, if at least one content chunk should be fetched.

14. The service delivery apparatus of claim 13, wherein the intercepted content manifest also includes a request sent to the broadcast server.

15. The service delivery apparatus of claim 12, wherein the apparatus is further configured to:
   fetch the content chunk from a cache of the CDN.

16. The service delivery apparatus of claim 12, wherein some of the fetched content chunks are fetched from a fast access memory, and some other fetched content chunks are fetched from a slower access storage device.

17. The service delivery apparatus of claim 12, wherein the apparatus is further configured to:
   monitor requests for content from at least the second user node; and
   determine if the second user node is selected to replace the current leader node.

18. The service delivery apparatus of claim 17, wherein the current leader node is the first user node.

19. The service delivery apparatus of claim 18, wherein a user node with the most future content chunks is determined to be the current leader node.

20. The service delivery apparatus of claim 19, wherein the CDN is deployed between the broadcast server and at least the first and second user nodes.

21. The service delivery apparatus of claim 12, wherein the content ID is segmented into different resolutions, and wherein the content chunks are delivered at different resolutions based on the segmented content ID.

* * * * *